United States Patent Office.

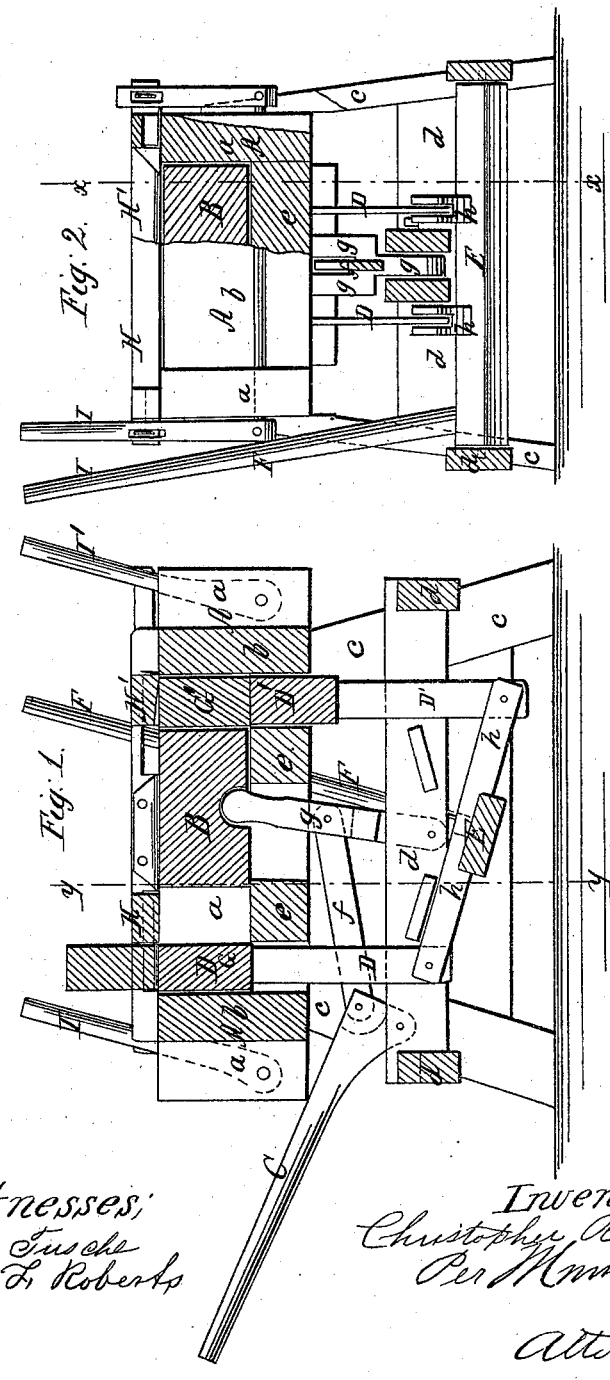

CHRISTOPHER BECKER, OF FLINT, MICHIGAN.

*Letters Patent No. 65,635, dated June 11, 1867.*

---

IMPROVED BRICK-PRESS.

---

*The Schedule referred to in these Letters Patent and making part of the same.*

---

TO ALL WHOM IT MAY CONCERN:

Be it known that I, CHRISTOPHER BECKER, of Flint, in the county of Genesee, and State of Michigan, have invented a new and improved Brick-Press; and I do hereby declare that the following is a full, clear, and exact description thereof, which will enable others skilled in the art to make and use the same, reference being had to the accompanying drawings forming part of this specification, in which—

Figure 1 is a vertical longitudinal section of my improved brick-press, taken on the line $x\,x$, fig. 2.

Figure 2 is a vertical cross-section of the same, taken on the line $y\,y$, fig. 1.

Similar letters of reference indicate like parts.

This invention relates to a machine in which two moulds are alternately used for forming and pressing brick by hand power. The invention consists in making three sides of each mould movable. One horizontal block moving between the two moulds presses the brick in one mould, and leaves the other open to be filled. A horizontal sliding-plate above each mould serves as a cover for the brick while the same is being pressed, and is then moved aside, so that the movable bottom of the mould may be elevated and raise the pressed brick to the level of the top of the mould. The sliding-cover then moves the brick aside, and clears the top of the vertical plunger. While the brick is being pressed in one mould the other mould is open and is being filled with clay; and when the brick has been finished in one mould the horizontal sliding-block is moved towards the other mould and presses the clay in the same, and so forth, the clay being alternately fed into one mould and pressed in the other. All the movable parts are operated by levers or other suitable devices.

A represents an oblong frame or box made of wood, or other suitable material, and consisting of the side-boards $a\,a$ and the end-boards $b\,b$ properly joined together and supported upon suitable pillars $c\,c$, which are strengthened together by horizontal or other braces $d$, as is clearly shown in the drawings. Across the bottom of the box A are placed and firmly secured in the side-boards $a\,a$ two strong wooden or other bars $e\,e$, upon which a movable block B rests. The same can be moved towards either end of the box, and is operated by a lever, C, which is pivoted to the frame or braces $d$, and is connected by a rod, $f$, with the centre of a vertical lever, $g$. The lower end of the latter is pivoted to the frame $d$, while its upper end is hinged to the block B, as is clearly shown in fig. 1. By moving the free end of the lever C up or down the block B is moved backward or forward in the box A. Between the end-boards $b\,b$ and the bars $e\,e$ are arranged vertical plungers D and D′, which form the bottom of the moulds when they are lowered, as shown. The lower end of each of the blocks D and D′, or its downward prolongation, is attached to one end of a horizontal bar, $h$, which is secured to a rock-shaft, E, as shown, so that as the latter is operated by a lever, F, which is attached to one of its ends, one of the plungers will be moved up and the other down alternately. Two moulds, G and G′, are thus formed respectively between one of the plungers, the end-board $b$, and that end of the block B which form the sides of that plunger, and the sides $a\,a$, of suitable dimensions, and open on top. The covers for the mould are formed by horizontal sliding-boards H H′, which rest on the edges of the side-boards $a\,a$, and are operated by levers I and I′ respectively, which are pivoted to the sides of the box A.

The following is the manner of operating the machine: The clay is placed into one mould, when the plunger is lowered, and the block B near to the other mould. The cover is moved aside to allow the mould to be filled from above. When filled, the mould is closed by moving the cover over it, and then the block B is moved towards the clay in that mould, and the brick is being pressed. The parts are then in the position shown in fig. 1 on the right-hand side of the block B. When the brick is pressed the cover is moved away from the mould, and the plunger is raised, thus raising the brick to a level with the top of the block B and end-pieces $b\,b$, as shown in fig. 1, above the plunger D. The covering-plate is then moved so as to sweep over the surface of the plunger, thus throwing the brick upon the edge of the end-board $b$. In the meanwhile the other mould has been filled with clay, and a brick can be formed therein in the manner above described. This machine will operate with great rapidity and regularity, and has no parts that can easily get out of order.

I claim as new, and desire to secure by Letters Patent—

A brick-press, consisting of a combination of the box A, block B, plungers D D′, and sliding-covers H H′, with each other, and with the suitable mechanism for operating the same, all made substantially as herein shown and described, and operating in such a manner that the brick are pressed alternately in the moulds G and G′, as set forth.

CHRISTOPHER BECKER.

Witnesses:
HENRY BROWN,
MATHEW DAVISON.